(12) United States Patent
Moore et al.

(10) Patent No.: US 9,316,278 B2
(45) Date of Patent: Apr. 19, 2016

(54) BRAKE PAD LIFE MONITORING SYSTEM

(71) Applicant: GM GLOBAL TECHNOLOGY OPERATIONS LLC, Detroit, MI (US)

(72) Inventors: Joseph K. Moore, Whitby (CA); Mauricio Vazquez Camarena, Whitby (CA); Stacey M. Blundell, Markham (CA); Paul S. Shaub, Detroit, MI (US); Phanu Amatyakul, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 198 days.

(21) Appl. No.: 14/094,094

(22) Filed: Dec. 2, 2013

(65) Prior Publication Data

US 2015/0152931 A1    Jun. 4, 2015

(51) Int. Cl.
*F16D 66/02* (2006.01)

(52) U.S. Cl.
CPC ............ *F16D 66/022* (2013.01); *F16D 66/021* (2013.01); *F16D 66/026* (2013.01); *F16D 66/027* (2013.01)

(58) Field of Classification Search
CPC ... F16D 66/021; F16D 66/022; F16D 66/026; F16D 66/027
USPC .............. 188/1.11 L, 1.11 R, 1.11 W, 1.11 E; 340/454, 657
See application file for complete search history.

(56) References Cited

U.S. PATENT DOCUMENTS

| | | | | |
|---|---|---|---|---|
| 3,958,445 A * | 5/1976 | Howard | ................. | F16D 66/027 188/1.11 L |
| 4,204,190 A * | 5/1980 | Wiley | .................. | F16D 66/026 188/1.11 L |
| 4,646,001 A * | 2/1987 | Baldwin | ................. | B04C 11/00 188/1.11 L |
| 5,825,287 A | 10/1998 | Zarybnicky, Sr. et al. | | |
| 6,360,850 B1 * | 3/2002 | Odisho | ................. | F16D 66/024 188/1.11 L |
| 6,384,721 B1 * | 5/2002 | Paielli | ..................... | F16D 66/02 188/1.11 L |
| 6,446,764 B1 * | 9/2002 | Huang | ................ | B60C 23/0408 188/1.11 L |
| 2003/0006896 A1 * | 1/2003 | Passwater | ............... | F16D 66/00 340/454 |
| 2010/0013620 A1 | 1/2010 | Degenstein et al. | | |
| 2012/0043980 A1 | 2/2012 | Davies | | |

FOREIGN PATENT DOCUMENTS

| | | |
|---|---|---|
| DE | 4139546 A1 | 6/1993 |
| DE | 4312354 C1 * | 6/1994 |
| DE | 69628379 T2 | 2/2004 |
| DE | 102006039591 A1 | 4/2008 |

* cited by examiner

*Primary Examiner* — Pamela Rodriguez
(74) *Attorney, Agent, or Firm* — Quinn Law Group, PLLC

(57) ABSTRACT

A brake pad life monitoring system can monitor the wear of a brake pad operatively coupled to a rotor. The brake pad life monitoring system includes an erodible, electrically non-conductive covering layer operatively coupled to the brake pad such that wear of the erodible, electrically non-conductive covering layer corresponds to the wear of the brake pad. Further, the brake pad life monitoring system includes an electrical circuit having a circuit path from a power supply to a ground. The electrical circuit is at least partially disposed on the erodible, electrically non-conductive covering layer and includes a first resistor connected in series with the power supply and a second resistor electrically connected in parallel with the power supply. The brake pad life monitoring system additionally includes a measuring device electrically connected to the electrical circuit.

9 Claims, 3 Drawing Sheets

US 9,316,278 B2

BRAKE PAD LIFE MONITORING SYSTEM

TECHNICAL FIELD

The present disclosure relates to a brake pad life monitoring system.

BACKGROUND

Vehicles, such as cars, include disc brakes for slowing the rotation of a wheel or another driven component. A disc brake may include a brake pad, a brake caliper, and a brake disc, which is also known as a rotor. The brake disc is operatively connected to the wheel, and the brake caliper is operatively coupled to the brake pad. During operation, the brake caliper can press the brake pad against the brake disc. As a consequence, the friction between the brake pad and the brake disc causes the brake disc (and the wheel attached to the brake disc) to slow or stop.

SUMMARY

Because the brake pad is subjected to friction during use, the brake pad may wear over time. It is therefore useful to monitor the wear of the brake pad in order to determine when the brake pad is about to reach the end of its life (i.e., when the brake pad should be replaced).

In an embodiment, the brake pad life monitoring system includes an erodible, electrically non-conductive covering layer operatively coupled to a brake pad such that the wear of the erodible, electrically non-conductive covering layer corresponds to the wear of the brake pad. Further, the brake pad life monitoring system includes an electrical circuit having a circuit path from a power supply to ground. The electrical circuit is at least partially disposed on the erodible, electrically non-conductive covering layer and includes a first resistor connected in series with the power supply and a second resistor electrically connected in parallel with the power supply. The brake pad life monitoring system additionally includes a measuring device electrically connected to the electrical circuit such that the measuring device is capable of determining a resistance value in the circuit path of the electrical circuit.

In another embodiment, the brake pad life monitoring system includes a plurality of wear sensors electrically connected to one another in series. Each wear sensor includes an erodible, electrically non-conductive covering layer and an electrical circuit as described above.

The present disclosure also relates to a vehicle, such as a car. The vehicle includes a rotor, a brake pad, and a plurality of wear sensors as described above.

The above features and advantages and other features and advantages of the present invention are readily apparent from the following detailed description of the best modes for carrying out the invention when taken in connection with the accompanying drawings.

DETAILED DESCRIPTION

Figure 1:
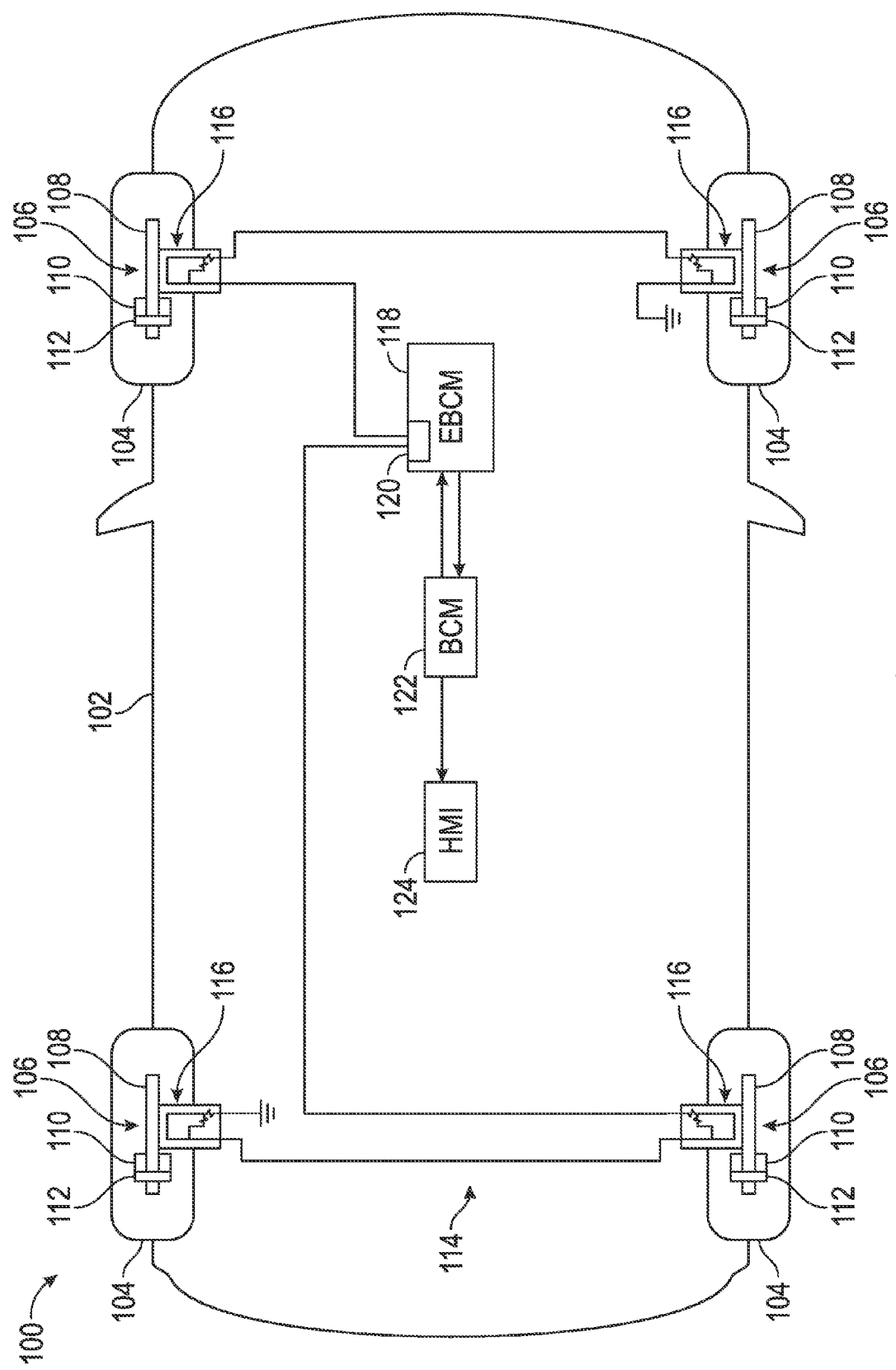
FIG. 1 is a schematic representation of a vehicle including a brake pad life monitoring system.

Referring now to the drawings, wherein the like numerals indicate corresponding parts throughout the several views, FIG. 1 schematically illustrates a vehicle 100, such as a car, including a vehicle body 102 and a plurality of wheels 104 operatively coupled to the vehicle body 102. The vehicle 100 includes brakes 106 operatively coupled to each wheel 104. As such, the brakes 106 can slow or stop the rotation of the wheels 104 when a driver presses a brake pedal (not shown). Each brake 106 includes a rotor 108 (or brake disc), at least one brake pad 110, and a brake caliper 112 (or any other suitable actuator) capable of pressing the brake pads 110 against the rotor 108. In the depicted embodiment, each brake 106 includes at least one set of two brake pads 110. Each brake pad 110 is therefore operatively coupled to the rotor 108. The brake caliper 112 is operatively coupled to the brake pedal (not shown). Accordingly, depressing the brake pedal (not shown) actuates the brake caliper 112. Upon actuation, the brake caliper 112 moves the brake pads 110 toward the rotor 108. The brake pads 110 are therefore movably coupled to the rotor 108. When the brake caliper 112 is actuated, the brake pads 110 contact the rotor 108. The friction between the brake pads 110 and the rotor 108 causes the rotor 108 (and the wheel 104 operatively coupled to the rotor 108) to slow down or stop. This friction gradually wears the brake pads 110. It is therefore useful to monitor the wear of the brake pads 110 in order to determine if the brake pads 110 should be replaced.

The brake pad life monitoring system 114 can monitor the wear of the brake pads 110. To do so, the brake pad life monitoring system 114 includes at least one wear sensor 116 for determining (e.g., monitoring) the wear of the brake pads 110. In the depicted embodiment, the brake pad life monitoring system 114 includes a plurality of wear sensors 116. Each wear sensor 116 is operatively coupled to at least one brake 106. Specifically, each wear sensor 116 is operatively coupled to at least one brake pad 110.

The vehicle 100 includes an electronic brake control module (EBCM) 118 in communication (e.g., electronic communication) with the each wear sensor 116. The terms "control module," "module," "control," "controller," "control unit," "processor" and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), sequential logic circuit(s), input/output circuit(s) and devices, appropriate signal conditioning and buffer circuitry, and other components to provide the described functionality. "Software," "firmware," "programs," "instructions," "routines," "code," "algorithms" and similar terms mean any controller executable instruction sets. The EBCM 118 includes at least one input/output interface 120 for outputting and receiving signals from the wear sensors 116. For example, the EBCM 118 may serve as a voltage source and therefore provide voltage to the wear sensors 116. Further, the EBCM 118 may receive signals from the wear sensors 116 that are indicative of the wear of the brake pads 110. The EBCM 118 may be deemed to be part of the brake pad life monitoring system 114 and includes a wear prediction algorithm for predicting the wear rate of the brake pads 110 installed by the original equipment manufacturer (OEM).

The vehicle 100 further includes a body control module (BCM) 122 in communication (e.g., electronic communication) with the EBCM 118. The BCM 122 can monitor and control various electronic accessories of the vehicle 100. For example, the BCM 122 can control the power windows, power mirrors, air conditioning, etc. The BCM 122 communicates with the EBCM 118 via a bus and can receive or output signals to the EBCM 118.

The vehicle 100 additionally includes a human machine interface (HMI) 124 in communication (e.g., electronic communication) with the BCM 122. The HMI 124 is in communication with the EBCM 118 via the BCM 122 and includes output devices, such as displays, to output information regarding the brake pad condition to a user (e.g., driver). In addition, the HMI 124 may include input devices, such as a keypad or touchscreens, to receive inputs from the user.

Figure 2:
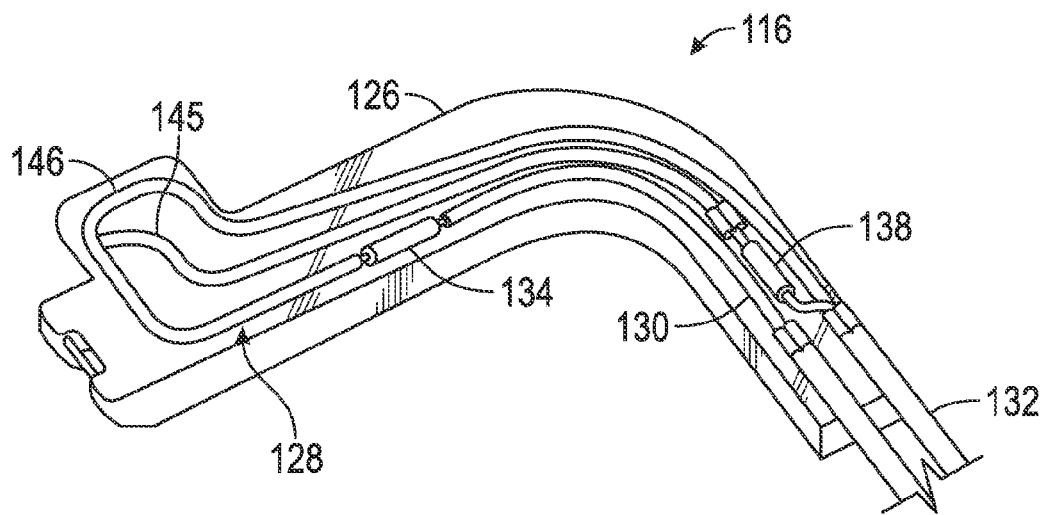
FIG. 2 is a schematic, perspective view of a wear sensor of the brake pad life monitoring system of FIG. 1.
Figure 3:
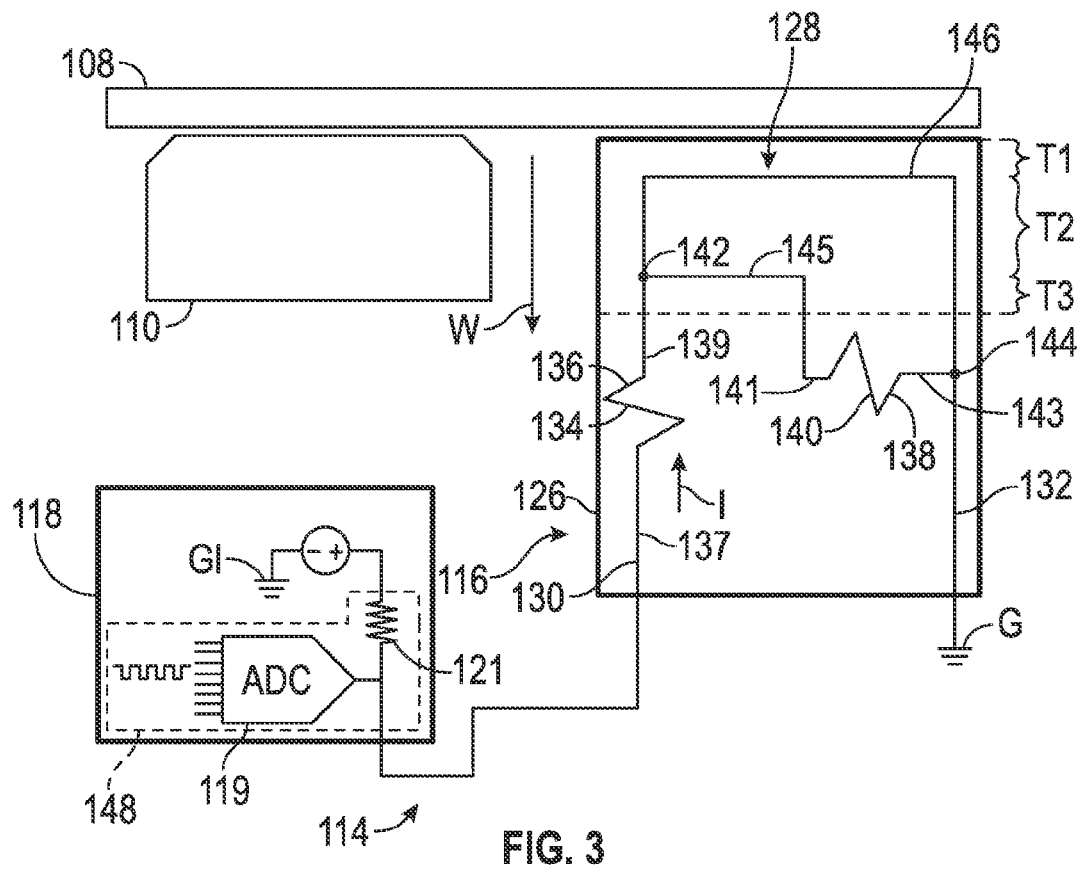
FIG. 3 is a schematic representation of a brake pad and a wear sensor of the brake pad life monitoring system of FIG. 1.

With reference to FIGS. 2 and 3, each wear sensor 116 includes an erodible, electrically non-conductive covering layer 126 and an electrical circuit 128 at least partially disposed on the erodible, electrically non-conductive covering layer 126. The erodible, electrically non-conductive covering layer 126 is wholly or partly made of an erodible material such as an erodible polymer and may be part of an erodible case. Moreover, the erodible, electrically non-conductive covering layer 126 supports at least part of the electrical circuit 128 and is operatively coupled to the brake pad 110 such that the wear of the erodible, electrically non-conductive covering layer 126 substantially matches (or at least corresponds) to the wear suffered by the brake pad 110. As a non-limiting example, the erodible, electrically non-conductive covering layer 126 may be substantially aligned with the brake pad 110 such that the wear of the brake pad 110 is identical (or at least substantially matches) the wear suffered by the brake pad 110. The erodible, electrically non-conductive covering layer 126 may be operatively connected to the brake pad 110 such that the erodible, electrically non-conductive covering layer 126 moves simultaneously with the brake pad 110. The friction between the rotor 108 and the brake pad 110 wears the brake pad 110 in the direction indicated by arrow W. Similarly, the friction between the rotor 108 and the erodible, electrically non-conductive covering layer 126 wears the wear sensor 116 in the direction indicated by arrow W.

The electrical circuit 128 has a circuit path I from a power supply V, such as a voltage source, to ground G and includes a first electrical conductor 130, such as a wire segment, connected to the power supply V. The ground G may be another part of the vehicle 100 such as the vehicle body 102, vehicle frame, or any other vehicle part suitable to function as ground. In the depicted embodiment, the EBCM 118 includes the power supply V. The power supply V may be a regulated power supply, such as a regulated 5-volt voltage source. The ECBM 118 may also include an internal ground GI. The first electrical conductor 130 may be referred to as the first wire segment and is electrically connected to the power supply V. For example, the first electrical conductor 130 may be electrically connected to a positive terminal of the power supply V. As discussed above, the power supply V may be part of the EBCM 118. The electrical circuit 128 further includes a second electrical conductor 132 electrically connected to ground G. The second electrical conductor 132 may be a wire segment and may therefore be referred to as the second wire segment.

The electrical circuit 128 further includes a first electronic component 134 electrically connected in series with the power supply V. The first electronic component 134 may be a passive electric component, such as a resistor. In the depicted embodiment, the first electrical component 134 is a first resistor 136 directly connected to the first electrical conductor 130. The first resistor 136 may be a two-terminal resistor and includes a first resistor input terminal 137 and a first resistor output terminal 139. The first electrical conductor 130 is electrically connected to the first resistor input terminal 137 of the first resistor 136.

The electrical circuit 128 additionally includes a second electronic component 138 shunted across the first resistor output terminal 139 of the first resistor 136 and the second electrical conductor 132. Accordingly, the second electronic component 138 is connected in parallel with the power supply V. The second electronic component 138 may be a passive electronic component, such as a resistor. In the depicted embodiment, the second electronic component 138 is a second resistor 140. The resistance value of the second resistor 140 may be different from the resistance value of the first resistor 136. The second resistor 140 is connected in parallel with the power supply V. The second electronic component 138 (e.g., the second resistor 140) may be connected to the first resistor output terminal 139 of the first resistor 136 at a first node 142 and to the second electrical conductor 132 at a second node 144. The second resistor 140 is electrically connected in parallel with the power supply V. In the depicted embodiment, the second resistor 140 is a two-terminal resistor and includes a second resistor input terminal 141 and a second resistor output terminal 143.

The electrical circuit 128 further includes a third electrical conductor 146 electrically interconnecting the first and second electrical conductors 130, 132. In the depicted embodiment, the third electrical conductor 146 is electrically connected to the first resistor 136 and the second electrical conductor 132. Specifically, the third electrical conductor 146 is directly connected to the first resistor output terminal 139. The third electrical conductor 146 may be a wire segment and may therefore be referred to as the third wire segment. Specifically, the third electrical conductor 146 is directly connected to the first node 142 and the second node 144. In the depicted embodiment, no electric component is electrically connected along the third electrical conductor 146. Thus, the third electrical conductor 146 is characterized by the absence of an electrical component, such as a resistor.

The electrical circuit 128 further includes a fourth electrical conductor 145 (e.g., fourth wire segment) electrically connected to the third electrical conductor 146 (e.g., third wire segment). In particular, the fourth electrical conductor 145 is directly connected to the first node 142 and a second resistor 140. In the depicted embodiment, the fourth electrical conductor 145 is directly connected to the second resistor input terminal 141. The second resistor output terminal 143 is directly connected to the second electrical conductor 132 (e.g., second wire segment).

The brake bad life monitoring system 114 further includes a measuring device 148 (e.g., ohmmeter, ammeter, voltmeter) to determine (e.g., measure) an electrical characteristic of the electrical circuit 128, such as resistance. In the depicted embodiment, the measuring device 148 is disposed within the EBCM 118 and can determine the resistance value of the electrical circuit 128. It is nonetheless contemplated that the measuring device 148 may be outside the EBCM 118. Thus, the measuring device 148 may be part of the EBCM 118. Regardless of its location, the the measuring device 148 is electrically connected to the electrical circuit 128 such that the measuring device 148 is capable of determining a circuit resistance value in the circuit path I of the electrical circuit 128. The measuring device 148 includes an analog-to-digital converter (ADC) 119 and a pull-up resistor 121. The ADC 119 can convert an analog signal into a digital signal.

The EBCM 118 can use the circuit resistance value determined by the measuring device 148 to take into account the wear rate differences between OEM brake pads and brake pads that replace the OEM brake pads (i.e., service pads or non-OEM brake pad). Specifically, the EBCM 118 employs the circuit resistance value determined by the measuring device 148 to compare the measured pad height against the calculated height by the algorithm at discrete wear thicknesses (T1 or T2) to thereby calculate a correction factor to the OEM brake pad wear rate or non-OEM brake pads. The circuit resistance value determined by the measuring device 148 can also be used to adjust the calculated cumulative wear of the brake pads 110 in the algorithm when uncontrolled factors on the brake caliper such as corrosion, misalignment or excessive friction increase the wear rate.

The wear sensor 116 generates the discrete data based on at least one electrical characteristic of the electrical circuit 128. As a non-limiting example, the wear sensor 116 can generate discrete data based, at least in part, on the resistance value of the electrical circuit 128. In particular, this discrete data is based, at least in part, on the resistance value of the circuit path I from the power supply V to ground G. The resistance value (or other electrical characteristic) of the electrical circuit 128 may change depending on the wear of the wear sensor 116.

During operation of the brake pad life monitoring system 114, the wear sensor 116 and the brake pad 110 contacts the rotor 108 at the same time, thereby generating friction between the wear sensor 116 and the rotor 108. The friction between the wear sensor 116 and the rotor 108 gradually wears the wear sensor 116. Initially, the friction between the wear sensor 116 and the rotor 108 causes the erodible, electrically non-conductive covering layer 126 to wear down, while the third electrical conductor 146 (e.g., third wire segment) is still electrically connected to the power supply V and ground G. At this point, the entire or a portion of the thickness T1 of the erodible, electrically non-conductive covering layer 126 is worn down, but the third electrical conductor 146 is still electrically connected to the power supply V and ground G. Accordingly, the electrical circuit 128 has a particular electrical characteristic. As a non-liming example, the resistance value of the electrical circuit 128 (i.e., circuit resistance value) is equal to the resistance value of the first resistor 136. In other words, the first resistor 136 is electrically connected to the power supply V and ground G such that the circuit resistance value of the electrical circuit 128 is equal to the first resistance value of the first resistor 136 when the third electrical conductor 146 is electrically connected to the power supply V and ground G. The resistance value of the first resistor 136 may be referred to as the first resistance value. Thus, the first resistor 136 has a first resistance value. The measuring device 148 may directly or indirectly determine the resistance value of the electrical circuit 128. Thus, the resistance value of the electrical circuit may be determined using Equation 1:

$$R = R1 \qquad \text{Equation 1}$$

wherein R is the resistance value of the electrical circuit 128; and

R1 is the resistance value of the first resistor 136.

The EBCM 118 then employs the discrete data signal from the measuring device 148 to determine the wear of the brake pad 110. When the resistance value of the electrical circuit 128 (i.e., circuit resistance value) is equal to the resistance value of the first resistor 136, the brake pad 110 does not need to be replaced. Accordingly, the EBCM 118 can communicate with the HMI 124 via the BCM 122 in order to output information relating to the condition of the brake pad 110. When only a portion or the entire thickness T1 of the erodible, electrically non-conductive covering layer 126 is worn down, the HMI 124 outputs data indicating the brake pad 110 does not need to be replaced. This outputted data can also be delivered via email or other electronic medium.

The first resistor 136 is useful to diagnose a short circuit (i.e., a short to ground situation). A short circuit (or short to ground) occurs when the current flows directly from the power supply V to ground G bypassing the first and second resistors 136, 140. Specifically, the first resistor 136 allows the EBCM 118 to distinguish between a situation when only the thickness T1 (or a portion thereof) has been worn down and a short circuit. In particular, when the thickness T1 (or a portion thereof) has been worn down, the resistance value of the electrical circuit 128 (i.e., circuit resistance value) is equal to the resistance value of the first resistor 136. On the other hand, when a short to ground situation occurs (i.e., a short circuit), the resistance value of the electrical circuit 128 is zero.

As the erodible, electrically non-conductive covering layer 126 continues to wear down due to the friction between the rotor 108 and the wear sensor 116, the thickness T1 of the erodible, electrically non-conductive covering layer 126 completely wears down and the thickness T2 of the erodible, electrically non-conductive covering layer 126 starts to wear down. When at least a portion of the thickness T2 wears down, the third electrical conductor 146 (e.g., third wire segment) is electrically decoupled from the power supply V and ground G. As a consequence, the electrical characteristic of the electrical circuit 128 changes. In the depicted embodiment, the resistance value of the electrical circuit 128 changes when the third electrical conductor 146 is electrically decoupled from the power supply V and ground G. At this point, the resistance value of the electrical circuit 128 (i.e., circuit resistance value) along the circuit path I (from the power supply V to ground G) now equals to the sum of the resistance value of the first resistor 136 (i.e., the first resistance value) and the resistance value of the second resistor 140 (i.e., the second resistance value). In other words, the second resistor 140 is electrically connected to the power supply V and ground G such that the circuit resistance value of the electrical circuit 128 is equal to the sum of the first resistance value and the second resistance value when the third electrical conductor 146 is electrically decoupled from the power supply V and ground G due to the wear of the wear sensor 116 caused by the rotor 108. When part or the entire thickness T2 of the wear sensor 116 is worn down, the resistance value of the electrical circuit 128 can be calculated using Equation 2:

$$R = R1 + R2 \qquad \text{Equation 2}$$

wherein R is the resistance value of the electrical circuit 128;
R1 is the resistance value of the first resistor 136; and
R2 is the resistance value of the second resistor 140.

The EBCM 118 then employs the discrete data signal from the measuring device 148 to determine the wear of the brake pad 110. When the resistance value of the electrical circuit 128 (i.e., circuit resistance value) is equal to the sum of the resistance value of the first resistor 136 (i.e., the first resistance value) and the resistance value of the second resistor 140 (i.e., the second resistance value), the brake pad 110 does not need to be replaced. However, the discrete data signal sent to the EBCM 118, at this point, is used as a wear correction factor and to determine the cumulative wear of the brake pad 110. As discussed above, the wear correction factor can be used to update the wear prediction algorithm for subsequent usage. The EBCM 118 can communicate with the HMI 124 via the BCM 122 in order to output information relating to the condition of the brake pad 110. When only a portion or the entire second thickness T2 of the erodible, electrically non-conductive covering layer 126 is worn down, the HMI 124 outputs data indicating the brake pad 110 does not need to be replaced. This outputted data can also be delivered via email or other electronic medium.

As the erodible, electrically non-conductive covering layer 126 continues to wear down due to the friction between the rotor 108 and the wear sensor 116, the thickness T2 of the erodible, electrically non-conductive covering layer 126 completely wears down and the thickness T3 of the erodible, electrically non-conductive covering layer 126 starts to wear down. When at least a portion of the thickness T3 wears down, the second electronic component 138 (e.g., second resistor 140) is electrically decoupled from the power supply V and ground G. As a consequence, the electrical characteristic of the electrical circuit 128 changes. In the depicted embodiment, the resistance value of the electrical circuit 128 (i.e., the circuit resistance value) changes when the second resistor 140 is electrically decoupled from the power supply V and ground G. At this point, the resistance value of the electrical circuit 128 (i.e., circuit resistance value) along the circuit path I (from the power supply v to ground G) is now infinite. In other words, the first resistor 136 and second resistor 140 are electrically connected to the power supply V and ground G such that the circuit resistance value of the electrical circuit 128 is infinite when the third electrical conductor 146 and the second resistor 140 are electrically decoupled from the power supply V and ground G due to the wear of the wear sensor 116 caused by the rotor 108.

The EBCM 118 then employs the discrete data signal from the measuring device 148 to determine the wear of the brake pad 110. When the resistance value of the electrical circuit 128 is infinite, the brake pad 110 is close to reaching the end of its life. This discrete data can be used to improve the precision of the wear prediction algorithm by correcting for cumulative wear near the end of the life of the brake pad 110. The EBCM 118 can communicate with the HMI 124 via the BCM 122 in order to output information relating to the condition of the brake pad 110. When only a portion or the entire second thickness T3 of the erodible, electrically non-conductive covering layer 126 is worn down, the HMI 124 outputs data indicating the condition of the brake pad 110. This outputted data can also be delivered via email or other electronic medium.

Figure 4:
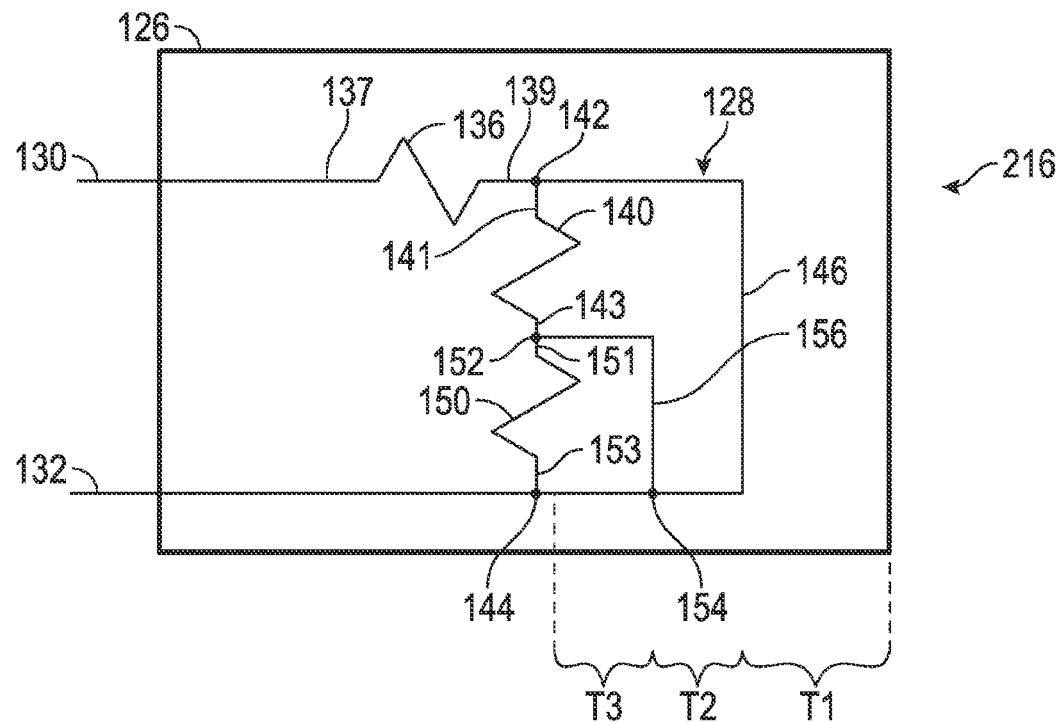
FIG. 4 is a schematic representation of a wear sensor of the brake pad life monitoring system in accordance with another embodiment of the present disclosure.

FIG. 4 schematically illustrates another embodiment of a wear sensor 216. The wear sensor 216 is substantially similar to the wear sensor 116 described above with respect to FIG. 3, but it includes a third resistor 150 to allow the brake pad life monitoring system 114 to distinguish between an open circuit and a situation in which at least a portion of the thickness T3 has worn down. The third resistor 150 has a third resistance value and is electrically connected in series with the second resistor 140. Moreover, the third resistor 150 is electrically connected in parallel with the power supply V (FIG. 3). The resistance value of the third resistor 150 (i.e., the third resistance value) may be different from the resistance values of the first resistor 136 and the second resistor 140. In this embodiment, the third resistor 150 is electrically connected across the first electrical conductor 130 (e.g., first wire segment) and the second electrical conductor 132 (e.g., second wire segment). Thus, the third resistor 150 is electrically connected between the first and second nodes 142, 144.

In the depicted embodiment, the third resistor 150 is a two-terminal resistor and includes a third resistor input terminal 151 and a third resistor output terminal 153. The third resistor input terminal 151 may be directly connected to the second resistor output terminal 143.

The electrical circuit 128 further includes a fifth electrical conductor 156 (e.g., fourth wire segment) directly connected to the third resistor input terminal 151. The fifth electrical conductor 156 may be electrically connected to a third node 152, which is located between the second and third resistors 140, 150. Furthermore, the fifth electrical conductor 156 is also connected to a four node 154 on the third electrical conductor 146. Thus, the fifth electrical conductor 156 may be directly connected to the third electrical conductor 146. When at least a portion of the thickness T3 of the wear sensor 116 wears down, the fifth electrical conduct 156 is electrically decoupled from the power supply V and ground G. As a consequence, the electrical characteristic of the electrical circuit 128 changes. At this point, the resistance value of the electrical circuit 128 is not infinite. Rather, when at least a portion of the thickness T3 of the wear sensor 116 wears down, the resistance value of the electrical circuit 128 along the circuit path I (from the power supply V to ground G) is now the sum of the resistance values of the first resistor 136, the second resistor 140, and the third resistor 150. Accordingly, if the measuring device 148 (FIG. 3) determines that the resistance value of the electrical circuit 128 is infinite, then the EBCM 118 can determine that the electrical circuit 128 is open. On the other hand, if the measuring device 148 (FIG. 3) determines that the resistance value of the electrical circuit 128 (i.e., circuit resistance value) is equal to the sum of the resistance values of the first resistor 136, the second resistor 140, and the third resistor 150, then the EBCM 118 can communicate to the user (via the HMI 124 or email) the condition of the brake pad 110. In other words, the third resistor 150 is electrically connected to the power supply V and ground G such that the circuit resistance value of the electrical circuit 128 is equal to the sum of the first resistance value of the first resistor 136, the second resistance value of the second resistor 140, and the third resistance value of the third resistor 150 when the fifth electrical conductor 156 (e.g., fourth wire segment) is electrically decoupled from the power supply V and ground G due to the wear of the wear sensor 116 caused by the rotor 108.

Figure 5:
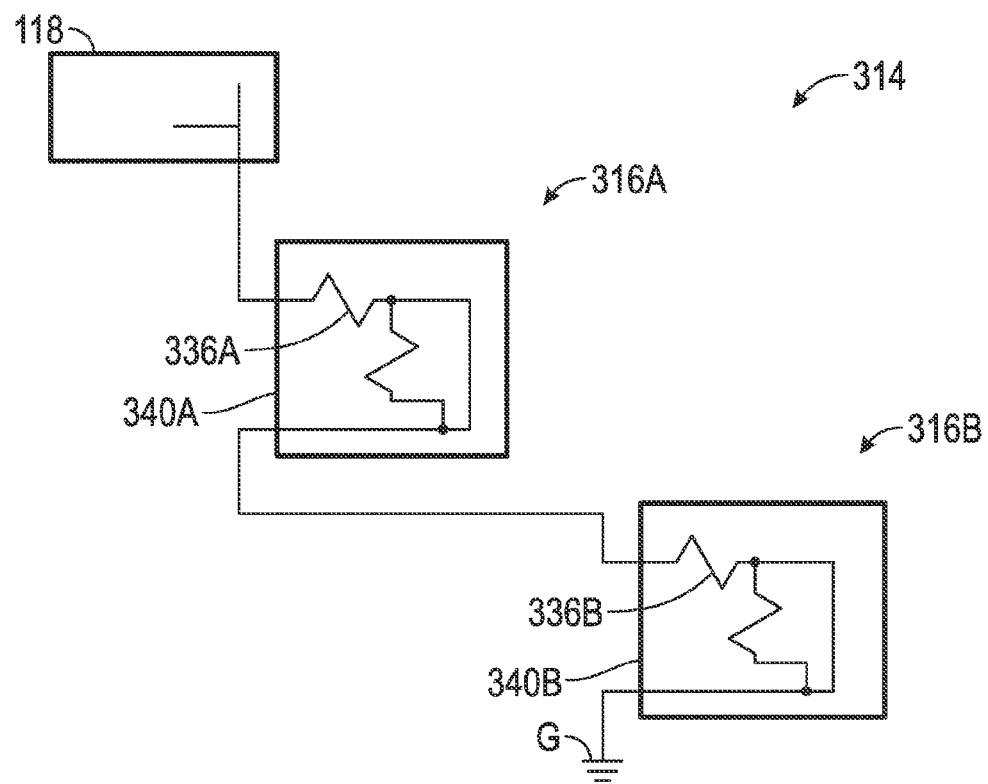
FIG. 5 is a schematic diagram of the brake pad life monitoring system of FIG. 1.

FIG. 5 schematically illustrates a brake pad life monitoring system 314 in accordance with another embodiment of the present disclosure. The brake pad life monitoring system 314 includes at least two wear sensors, namely, the first wear sensor 316A and the second wear sensor 316B. In the interest of simplicity, FIG. 5 shows only two wear sensors 316A, 316B. It is contemplated, however, that the brake pad life monitoring system 314 may include more than two wear sensors (e.g., four wear sensors).

The first and second wear sensors 316 are substantially similar to the wear sensor 116 described above, except for the features described below. The first wear sensor 316A includes a first resistor 336A and a second resistor 340A. Similarly, the second wear sensor 316B includes a first resistor 336B and a second resistor 340B. All of the resistors 336A, 340A, 336B, and 340B may have different resistance values. It is nevertheless contemplated that some of the resistors 336A, 340A, 336B, and 340A may have the same resistance value.

The wear sensors 316A, 316B can be electrically connected to each other in series to thereby allow the wear sensors 316A, 316B to be connected to the EBCM 116 via a single input/output interface 120 (FIG. 1). As a non-limiting example, the first and second wear sensors can be electrically connected to each other in series, and, therefore, only one input/output interface 120 is needed per axle of the vehicle 100. The resistors 336A, 340B, 336B, and 316B of the brake pad life monitoring system 314 have different resistance values so that the EBCM 118 can determine the wear of each brake pad 110 even if the wear of some of the brake pads 100 are different.

While the best modes for carrying out the invention have been described in detail, those familiar with the art to which this invention relates will recognize various alternative designs and embodiments for practicing the invention within the scope of the appended claims.

The invention claimed is:

1. A brake pad life monitoring system for monitoring wear of a brake pad operatively coupled to a rotor, the brake pad life monitoring system comprising:
    an erodible, electrically non-conductive covering layer operatively coupled to the brake pad such that wear of the erodible, electrically non-conductive covering layer corresponds to the wear of the brake pad;
    an electrical circuit having a circuit path from a power supply to a ground, the electrical circuit being at least partially disposed on the erodible, electrically non-conductive covering layer, wherein the electrical circuit includes:
        a first resistor electrically connected in series with the power supply;
        a first electrical conductor connected to the power supply, wherein the first resistor is directly connected to the first electrical conductor;
        a second electrical conductor connected to the ground;
        a second resistor electrically connected in parallel with the power supply;
        a third electrical conductor electrically connected to the first resistor and the second electrical conductor; and
    a measuring device electrically connected to the electrical circuit such that the measuring device is capable of determining a circuit resistance value in the circuit path of the electrical circuit, wherein the first resistor has a first resistance value and is electrically connected to the power supply and the ground such that the circuit resistance value is equal to the first resistance value.

2. The brake pad life monitoring system of claim 1, wherein the second resistor has a second resistance value, and the second resistor is electrically connected to the power supply and the ground such that the circuit resistance value is equal to a sum of the first resistance value and the second resistance value when the third electrical conductor is electrically decoupled from the power supply and the ground due to wear caused by the rotor.

3. The brake pad life monitoring system of claim 2, wherein the first and second resistors are connected to the power supply and the ground such that the circuit resistance value is infinite when the third electrical conductor and the second resistor are electrically decoupled from the power supply and the ground due to the wear caused by the rotor.

4. A brake pad life monitoring system for monitoring wear of a brake pad operatively coupled to a rotor, the brake pad life monitoring system comprising:
    a power supply;
    a plurality of wear sensors electrically connected to the power supply, the wear sensors being electrically connected to one another in series, wherein each of the wear sensors includes:
        an erodible, electrically non-conductive covering layer operatively coupled to the brake pad such that wear of the erodible, electrically non-conductive covering layer corresponds to the wear of the brake pad;
        an electrical circuit having a circuit path from the power supply to a ground, the electrical circuit being at least partially disposed on the erodible, electrically non-conductive covering layer, wherein the electrical circuit includes:
            a first resistor connected in series with the power supply;
            a first electrical conductor connected to the power supply, wherein the first resistor is connected to the first electrical conductor;
            a second electrical conductor connected to the ground;
            a second resistor electrically connected in parallel with the power supply;
            a third electrical conductor connected to the first resistor and the second electrical conductor; and
    a measuring device electrically connected to the electrical circuit such that the measuring device is capable of determining a circuit resistance value in the circuit path of the electrical circuit, wherein the first resistor has a first resistance value and is electrically connected to the power supply and the ground such that the circuit resistance value is equal to the first resistance value.

5. The brake pad life monitoring system of claim 4, wherein the first resistor is directly connected to the first electrical conductor.

6. The brake pad life monitoring system of claim 4, wherein all of the first and second resistors of the plurality of wear sensors have different resistance values.

7. A vehicle, comprising:
    a rotor;
    a brake pad movably coupled to the rotor;
    an electronic brake control module including a power supply;
    a plurality of wear sensors electrically connected to one another in series, wherein each of the wear sensors includes:
        an erodible, electrically non-conductive covering layer operatively coupled to the brake pad such that wear of the erodible, electrically non-conductive covering layer corresponds to wear of the brake pad;
        an electrical circuit at least partially disposed on the erodible, electrically non-conductive covering layer, wherein the electrical circuit includes:
            a first electrical conductor electrically connected to the power supply;
            a first resistor having a first resistance value and being electrically connected to the first electrical conductor, the first resistor being connected in series with the power supply;
            a second electrical conductor electrically connected to a ground;
            a third electrical conductor electrically connected between the first resistor and the second electrical conductor;
            a second resistor having a second resistance value and being electrically connected in parallel with the electronic brake control module, the second resistor being connected to the first resistor and the second electrical conductor; and
    wherein the electronic brake control module includes a measuring device electrically connected to the electrical circuit such that the measuring device is capable of determining a circuit resistance value along a circuit path from the electronic brake control module to the second electrical conductor, wherein the first resistor has a first resistance value and is electrically connected to the power supply and the ground such that the circuit resistance value is equal to the first resistance value.

8. The vehicle of claim 7, wherein the first resistor is directly connected to the first electrical conductor.

9. The vehicle of claim 7, wherein all of the first and second resistors of the plurality of wear sensors have different resistance values.

\* \* \* \* \*